United States Patent [19]

Hashizume et al.

[11] 4,252,697

[45] Feb. 24, 1981

[54] PROCESS FOR PREPARING AN AQUEOUS DISPERSION OF SYNTHETIC RESIN MUTUALLY DISSOLVED WITH A CELLULOSE ACETATE ALKYLATE

[75] Inventors: Yoshio Hashizume; Masatoshi Mikumo; Fumio Takenaka, all of Oimachi, Japan

[73] Assignee: Daicel, Ltd., Osaka, Japan

[21] Appl. No.: 83,924

[22] Filed: Oct. 11, 1979

[30] Foreign Application Priority Data

Oct. 17, 1978 [JP] Japan .............................. 53/127526

[51] Int. Cl.$^3$ ............................................... C08L 1/12
[52] U.S. Cl. .................................... 260/17 A; 526/200
[58] Field of Search ...................................... 260/17 A

[56] References Cited

U.S. PATENT DOCUMENTS

| | | | |
|---|---|---|---|
| 3,953,386 | 4/1976 | Murphy et al. | 260/17 A |
| 4,011,388 | 3/1977 | Murphy et al. | 260/17 A |

Primary Examiner—Edward M. Woodberry
Attorney, Agent, or Firm—Blanchard, Flynn, Thiel, Boutell & Tanis

[57] ABSTRACT

An aqueous dispersion of synthetic resin mutually dissolved with a cellulose acetate alkylate is prepared by mixing water, a protective colloid and/or a surfactant, a cellulose acetate alkylate, an oil-soluble radical polymerization initiator and at least one monomer in which the cellulose acetate alkylate and the oil-soluble radical polymerization initiator are soluble, under stirring, to form an aqueous dispersion and then subjecting the monomer to radical polymerization to form a homogeneous mixture of the cellulose acetate alkylate and at least one polymer in the particles in the aqueous dispersion.

5 Claims, No Drawings

PROCESS FOR PREPARING AN AQUEOUS DISPERSION OF SYNTHETIC RESIN MUTUALLY DISSOLVED WITH A CELLULOSE ACETATE ALKYLATE

The present invention relates to a process for preparing an aqueous dispersion of synthetic resin mutually dissolved with a cellulose acetate alkylate.

According to conventional techniques, a cellulose acetate alkylate and a polymer having a high glass transition temperature or the fluidity of which is reduced at a temperature above the glass transition temperature must be dissolved in an organic solvent prior to the formation of an aqueous dispersion thereof. From Japanese Patent Laid-Open No. 28188/1976 (particularly Example 3), etc., a process has been known which comprises dissolving a cellulose acetate alkylate such as cellulose acetate butyrate in a monomer such as an acrylic ester, which monomer also replaces the organic solvent, in the presence of a surfactant to form an aqueous dispersion, and subjecting the acrylic ester to radical polymerization in the presence of a water-soluble polymerization initiator to obtain an aqueous dispersion of a mixture of cellulose acetate butyrate and the acrylic ester polymer.

However, those processes have the disadvantage that a stable aqueous dispersion of synthetic resin mutually dissolved with a cellulose acetate alkylate cannot be obtained by those processes. Namely, according to those processes, large particles (diameter: 0.05–0.3 mm) of the cellulose acetate alkylate are present independently from the monomer particles (diameter: less than $1\mu$). This fact indicates that in the resulting aqueous dispersion, the polymer formed from the monomer is not homogeneously mixed with the cellulose acetate alkylate. Another disadvantage is that certain characteristic features of the cellulose acetate alkylate are not exhibited at all in the final aqueous dispersion and products made therefrom, particularly with respect to the hardness of a film formed from the aqueous dispersion or the minimum film-forming temperature.

After intensive investigations for eliminating those disadvantages, the inventors have discovered a process for preparing a highly stable, aqueous dispersion of synthetic resin mutually dissolved with a cellulose acetate alkylate, characterized by mixing water, a protective colloid and/or a surfactant, a cellulose acetate alkylate, an oil-soluble radical polymerization initiator and at least one monomer in which the cellulose acetate alkylate and the oil-soluble radical polymerization initiator are completely soluble, under stirring, to form an aqueous dispersion and then subjecting the monomer to radical polymerization to form a homogeneous mixture of the cellulose acetate alkylate and a polymer formed from at least one of said monomers in the particles in the aqueous dispersion. The present invention has been attained on the basis of this finding. The present invention will be further described in detail below.

As the protective colloid used in the present invention, there can be used any water-soluble substance capable of maintaining stable the aqueous dispersion of cellulose acetate alkylate and the monomer, and which improves the compatibility or mutual solubility of the polymer formed from the monomer and the cellulose acetate alkylate in the polymerization step. Thus, the protective colloid is not particularly limited and effective results can be obtained by using various known protective colloids useful for forming aqueous dispersions of radical polymerizable monomers. It is preferred to use about 0.5 to 3 parts by weight of a cellulose derivative protective colloid, such as hydroxyethylcellulose, per 100 parts by weight of the sum of the cellulose acetate alkylate and the monomer. If the amount of the protective colloid is less than 0.5 part by weight, it is difficult to obtain a stable aqueous dispersion of the cellulose acetate alkylate and the monomer and, therefore, the polymerization stability becomes unsatisfactory. On the other hand, if the amount of the protective colloid is more than 3 parts by weight, the viscosity of the resulting aqueous dispersion is increased remarkably and the physical properties, particularly, water resistance, are poor, even though the polymerization stability is increased.

Methyl cellulose, carboxy methyl cellulose and polyvinylalcohol may be used also as a water-soluble protective colloid.

The surfactant used in the present invention is not particularly limited. However, preferably, an anionic surfactant alone or a mixture of an anionic surfactant and a nonionic surfactant is used. The nonionic surfactant may be used at an amount of up to 8 wt.% based on the total surfactants. As the anionic surfactants, there can be mentioned orthophosphate esters of polyethoxylated aliphatic alcohols or alkylphenols and sodium alkylbenzenesulfonates and 2-sodium salt of alkoxy alkylphenol succinic monoesters. As the nonionic surfactants, there can be mentioned polyoxyethylene alkyl ethers such as polyoxyethylene nonylphenyl ethers (HLB: about 12–18). It is desirable to use about 3 to 10 parts by weight of the surfactant, per 100 parts by weight of the monomer. If the amount of the surfactant is less than 3 parts by weight, it is difficult to obtain a stable aqueous dispersion of the cellulose acetate alkylate and the monomer and, therefore, the polymerization stability becomes unsatisfactory. On the other hand, if the amount of the surfactant is more than 10 parts by weight, the physical properties, particularly, the water resistance, of the resulting polymer are poor, even though the polymerization stability is excellent.

The above mentioned protective colloid and surfactant may be used either separately or together.

The cellulose acetate alkylates used in the present invention are not particularly limited and various cellulose acetate alkylates can be used. It is desirable to use, for example, cellulose acetate butyrate or cellulose acetate propionate in an amount of about 1 to 30 parts by weight, per 100 parts by weight of the sum of the polymer and cellulose acetate alkylate. If the amount of the cellulose acetate alkylate is less than 1 part by weight, the characteristic features of the cellulose acetate alkylate with respect to the physical properties, hardness and film-forming property of the resulting aqueous dispersion are not exhibited, even though the polymerization stability is excellent. On the other hand, if the amount of the cellulose acetate alkylate is more than 30 parts by weight, it is difficult to obtain a stable aqueous dispersion in which the cellulose acetate alkylate is dispersed homogeneously.

It is a critical requirement of the invention that the radical polymerization initiator used in the present invention is oil-soluble in order to maintain the stability of the particles of the cellulose acetate alkylate and monomer in water.

A reason for this requirement is that if a water-soluble radical polymerization initiator is used, only the polymerization of the monomer proceeds, whereby the cellulose acetate alkylate is flocculated separately from the polymer formed from the monomer and a stable aqueous dispersion of the cellulose acetate alkylate and the polymer formed from the monomer is not formed. On the other hand, if an oil-soluble radical polymerization initiator such as lauryl peroxide, benzoyl peroxide or cumene hydroperoxide is used, the polymerization of the monomer proceeds in the particles of the monomer and the cellulose acetate alkylate, whereby the cellulose acetate alkylate and the polymer formed from the monomer are sufficiently dissolved or homogeneously dispersed in each other. Accordingly, the phenomenon of separation and flocculation of the cellulose acetate alkylate, separately from the polymer, is not observed, but rather, there is obtained a homogeneous aqueous dispersion possessing surprisingly excellent stability of the particles of the cellulose acetate alkylate and the monomer.

The monomers used in the present invention are not particularly limited and various monomers may be used. Among them, particularly preferred monomers are, for example, vinyl monomers of the general formula:

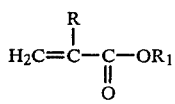

(I)

wherein R represents hydrogen atom or methyl group and $R_1$ represents hydrogen, an alkyl group of 1–20 carbon atoms, a cycloalkyl group having 5–6 carbon atoms in the alkyl group, —CH$_2$CH$_2$OCH$_2$CH$_3$, —C$_6$H$_5$ or —CH$_2$C$_6$H$_5$.

Other useful monomers are substituted and unsubstituted styrenes of the general formula:

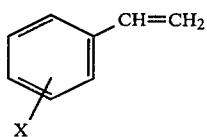

(II)

wherein X represents hydrogen atom, methyl group or a halogen atom, especially chlorine or bromine.

A mixture of a vinyl monomer of the above general formula (I) and substituted or unsubstituted styrene of the above general formula (II) can also be used. Further, a combination of a vinyl monomer of the above general formula (I) and/or substituted or unsubstituted styrene of the above general formula (II) and an epoxy compound such as glycidyl methacrylate and/or vinyl acetate monomer and/or acrylonitrile monomer is also included.

A preferred embodiment of the process of the present invention will be described below.

An oil-soluble radical polymerization initiator and a cellulose acetate alkylate are added to a monomer and the entirety is stirred with a conventional homomixer to completely dissolve them. The resulting solution is then mixed with an aqueous solution of a protective colloid and/or a surfactant whereby to obtain a milky dispersion. The dispersion is heated to about 70° C. under a nitrogen gas atmosphere and is subjected to radical polymerization for about 6 hours whereby to obtain a highly stable, aqueous dispersion of the cellulose acetate alkylate and the polymer particles formed from the monomer. The aqueous dispersion thus obtained is suitable for use in fields in which properties such as hardness and weather resistance of coatings formed therefrom are to be improved by the addition of additives such as pigments, thickening agents, anti-foaming agents, solvents and plasticizers.

The following examples and comparative examples further illustrate the present invention. In the examples, parts and percentages are given by weight.

EXAMPLE 1

In a 500 cc flask, 3 g of benzoyl peroxide (oil-soluble radical polymerization initiator) and 0.3 g of n-laurylmercaptan (polymerization modifier) were charged. Then, 148 g of methyl methacrylate, 148 g of ethyl acrylate and 4 g of methacrylic acid were added thereto and the whole was stirred at room temperature to obtain a solution. To the solution was added 45 g of cellulose acetate butyrate (CAB 381-0.5 sec.; a product of Eastman Chemical Co.) (cellulose acetate alkylate) and the entirety was stirred at room temperature to obtain a solution. The solution was transferred into a 2-liter polymerization vessel and there was added 138 g of 5% aqueous solution of hydroxyethylcellulose (a product of U.C.C. Co.; Cellosize WP-300) (protective colloid) and 218.5 g of water. The mixture was stirred with a homomixer in cold water (0° C.) for about 20 minutes. To the resulting mixture was added an aqueous solution of 12 g of Gafag RE 610 (an anionic surfactant) and 13.3 g of sodium dodecylbenzenesulfonate (anionic surfactant) in 115 g of water and the entirety was further stirred with the homomixer for about 25 minutes to obtain an aqueous dispersion (pH 2.6). The aqueous dispersion was heated and radical polymerization was carried out under a nitrogen gas atmosphere at 70°–75° C. for 6 hours, the polymerization reaction mixture was neutralized with aqueous ammonia and filtered through a stainless steel gauze (200 mesh) to obtain an aqueous dispersion of acrylic ester resin mutually dissolved with cellulose acetate butyrate, which dispersion exhibited a quite excellent stability (solid content 42.2%; viscosity 3,750 cps; pH 7.0). A coating film prepared from the aqueous dispersion was transparent and had a minimum film-forming temperature of about 35° C.

EXAMPLE 2

The procedure of Example 1 was repeated except that in place of hydroxyethylcellulose, there was used an equal amount of polyvinyl alcohol (PVA-217; a product of Kuraray Co.) as the protective colloid. There was obtained a highly stable aqueous dispersion of acrylic ester copolymer mutually dissolved with the cellulose acetate butyrate (solid content 42.0%; viscosity 2,000 cps; pH 7.2). A coating film prepared from the aqueous dispersion was transparent and had a minimum film-forming temperature of about 35° C.

EXAMPLE 3

The procedure of Example 1 was repeated except that styrene was used as a part of the monomer composition. In this case, a monomer composition comprising 74 g of styrene, 74 g of methyl methacrylate, 148 g of ethyl acrylate and 4 g of acrylic acid was used. There was obtained a quite stable aqueous dispersion of acrylic ester-styrene copolymer resin mutually dissolved with cellulose acetate butyrate (solid content 42.1%; viscosity 1,500 cps; pH 7.3). A coating film prepared from the aqueous dispersion was transparent and had a minimum film-forming temperature of about 40° C.

EXAMPLE 4

The procedure of Example 1 was repeated except that styrene was used as a part of the monomer composition. In this case, a monomer composition comprising 74 g of styrene, 74 g of methyl methacrylate, 48 g of ethyl acrylate and 4 g of acrylic acid was used, and 45 g of cellulose acetate propionate were added thereto, in place of the cellulose acetate butyrate used in Example 1. There was obtained a quite stable aqueous dispersion of acrylic ester-styrene copolymer resin mutually dissolved with cellulose acetate propionate (solid content 42.3%; viscosity 2,500 cps and pH 7.5). A coating film prepared from the aqueous dispersion was transparent and had a minimum film-forming temperature of about 50° C.

COMPARATIVE EXAMPLE 1

In a 1.10 liter Kady Mill made by Kinetic Dispersion Corporation, Buffalo, New York provided with a jacket, there were charged 57.6 g of orthophosphate ester of an anionic polyethoxylated aliphatic alcohol (25% aqueous solution), 27.4 g of an annionic straight chain aralkyl sulfonate (35% aqueous solution), 3.8 g of sodium hydrogencarbonate, 180 ml of water, monomers (4.0 g of methacrylic acid, 148.0 g of methyl methacrylate and 148.0 g of ethyl acrylate), 0.08 g of hydroquinone monomethyl ether and 100.0 g of cellulose acetate butyrate (CAB 381, ½ sec.; a product of Eastern Chemical Co.). The mixture was treated in the mill for 30 minutes. The dispersion was transferred into a polymerizer provided with a stirrer and there were added 0.25 g of n-dodecylmercaptan and five drops of 0.15% ammonium ferric sulfate (polymerization regulators). Then, 0.60 g of potassium persulfate (polymerization initiator) and 40 g of nonionic ethoxylated monohydric and polyhydric alcohols (surfactants) and 45 g of water were added dropwise at 71°–76° C. for 118 minutes to add an aliquot (29 g) thereof. Thereafter, the remainder of the polymerization initiator and 0.15 g of sodium sulfite were added thereto at 75°–76° C. for 45 minutes to effect the polymerization of the dispersion under a nitrogen gas atmosphere. A considerable amount of flocs (polymer masses) was formed in the polymer solution. The solution became unstable and flocculated during the course of the polymerization.

COMPARATIVE EXAMPLE 2

The same procedure as described in Example 1 was repeated except that water-soluble potassium persulfate was used as the polymerization initiator. The resulting resin dispersion contained a large amount of flocs and was unstable.

COMPARATIVE EXAMPLE 3

The polymerization was carried out in the same manner as described in Example 1 except that 34.5 g of 10% aqueous hydroxyethylcellulose solution and 39.1 g of water were used to increase the ratio of hydroxyethylcellulose. The resulting aqueous dispersion of synthetic resin had an increased viscosity and a satisfactory dispersion could not be obtained.

The embodiments of the invention in which an exclusive property or privilege is claimed are defined as follows:

1. A process for preparing a stable aqueous dispersion of synthetic resin particles, said particles containing cellulose acetate alkylate dissolved or homogeneously dispersed therein, which comprises the steps of: completely dissolving from 1 to 30 parts by weight of cellulose acetate alkylate and an effective initiating amount of oil-soluble radical polymerization initiator in 100 parts by weight of one or a mixture of liquid, radical-polymerizable, water-insoluble monomers capable of dissolving said cellulose acetate alkylate and said initiator, whereby to obtain a first liquid solution consisting essentially of said cellulose acetate alkylate and said initiator homogeneously dissolved in said monomer or monomers; then mixing said first liquid solution with water and with water-soluble protective colloid, water-soluble synthetic organic surfactant or mixture thereof effective for forming a stable aqueous dispersion of said monomer or monomers in water whereby to form a stable aqueous dispersion consisting essentially of droplets of said first liquid solution dispersed in water; then subjecting said dispersion to radical polymerization conditions effective to polymerize said monomer or monomers whereby to obtain an aqueous dispersion of particles of polymer of said monomer or monomers and containing said cellulose acetate alkylate dissolved or homogeneously dispersed therein.

2. A process as claimed in claim 1 in which said protective colloid is hydroxyethyl cellulose and the amount thereof is from 0.5 to 3 parts by weight, per 100 parts by weight of the sum of said cellulose acetate alkylate and said monomer, and said surfactant is anionic surfactant or a mixture of anionic and nonionic surfactant and the amount of said surfactant is from 3 to 10 parts by weight, per 100 parts by weight of said monomer.

3. A process as claimed in claim 1 or claim 2 in which said cellulose acetate alkylate is selected from the group consisting of cellulose acetate butyrate and cellulose acetate propionate.

4. A process as claimed in claim 1 or claim 2 in which said monomer is selected from the group consisting of vinyl monomers having the formula

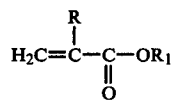

wherein R is hydrogen or methyl, and $R_1$ is hydrogen, alkyl having 1 to 20 carbon atoms, cycloalkyl having 5 or 6 carbon atoms, $-CH_2CH_2OCH_2CH_3$, $-C_6H_5$ or $-CH_2C_6H_5$, and styrene monomers having the formula

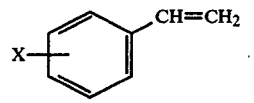

wherein X is hydrogen, methyl or halogen, and mixtures thereof.

5. A process as claimed in claim 3 in which said monomer is selected from the group consisting of vinyl monomers having the formula

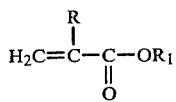
wherein R is hydrogen or methyl, and $R_1$ is hydrogen, alkyl having 1 to 20 carbon atoms, cycloalkyl having 5 or 6 carbon atoms, $-CH_2CH_2OCH_2CH_3$, $-C_6H_5$ or $-CH_2C_6H_5$, and styrene monomers having the formula
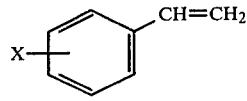
wherein X is hydrogen, methyl or halogen, and mixtures thereof.
* * * * *